April 5, 1932.  J. C. SWINNEY  1,852,630
MACHINE FOR CUTTING ICE CREAM OR OTHER BLOCKS
Filed Feb. 6, 1930   2 Sheets-Sheet 1
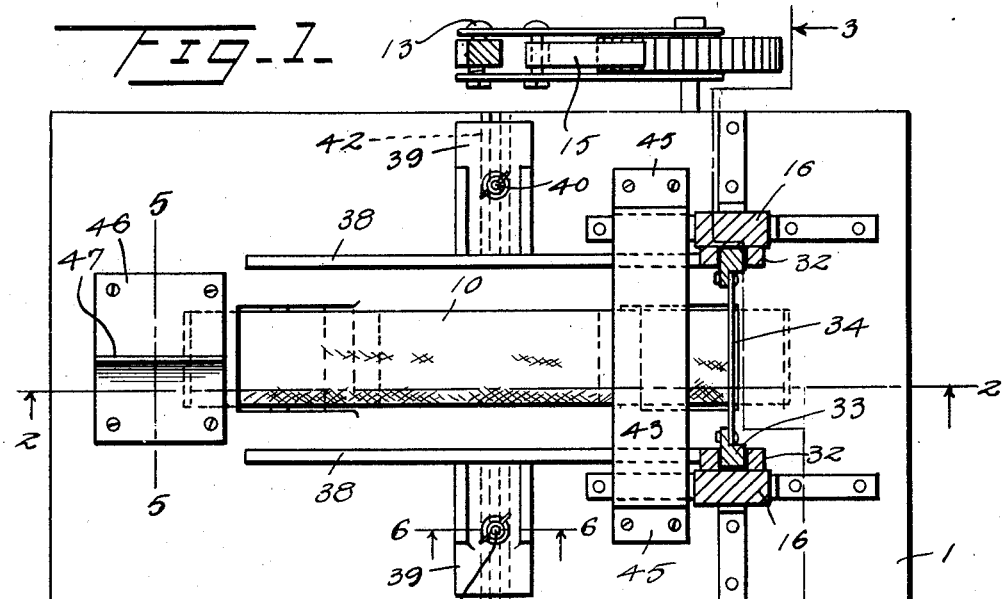
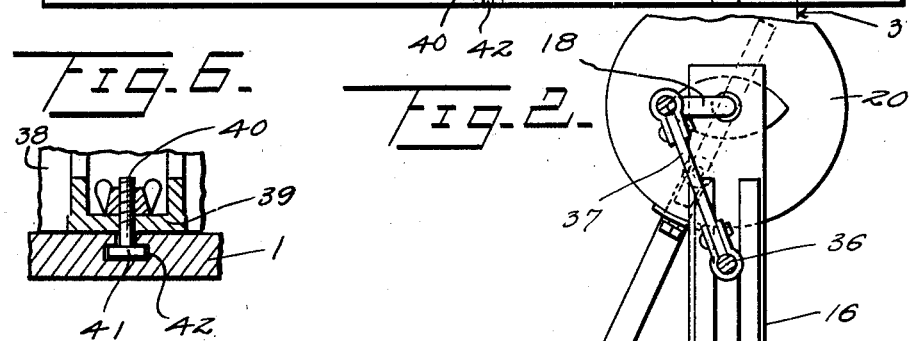
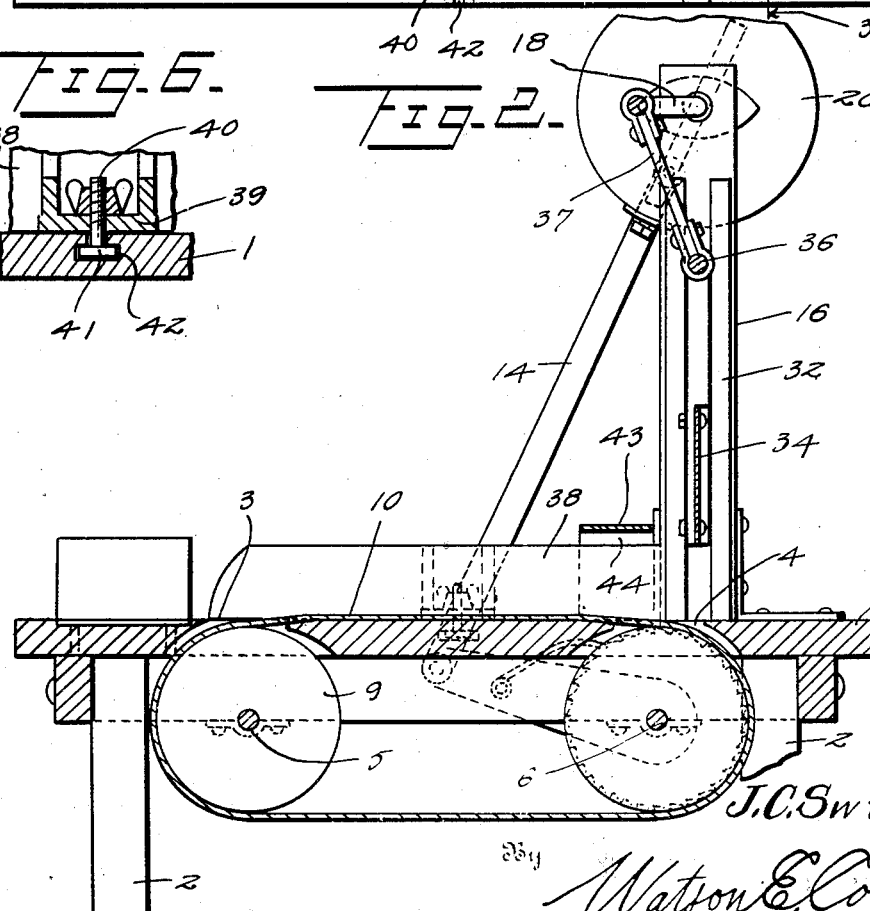
Inventor
J. C. Swinney
By Watson E. Coleman
Attorney

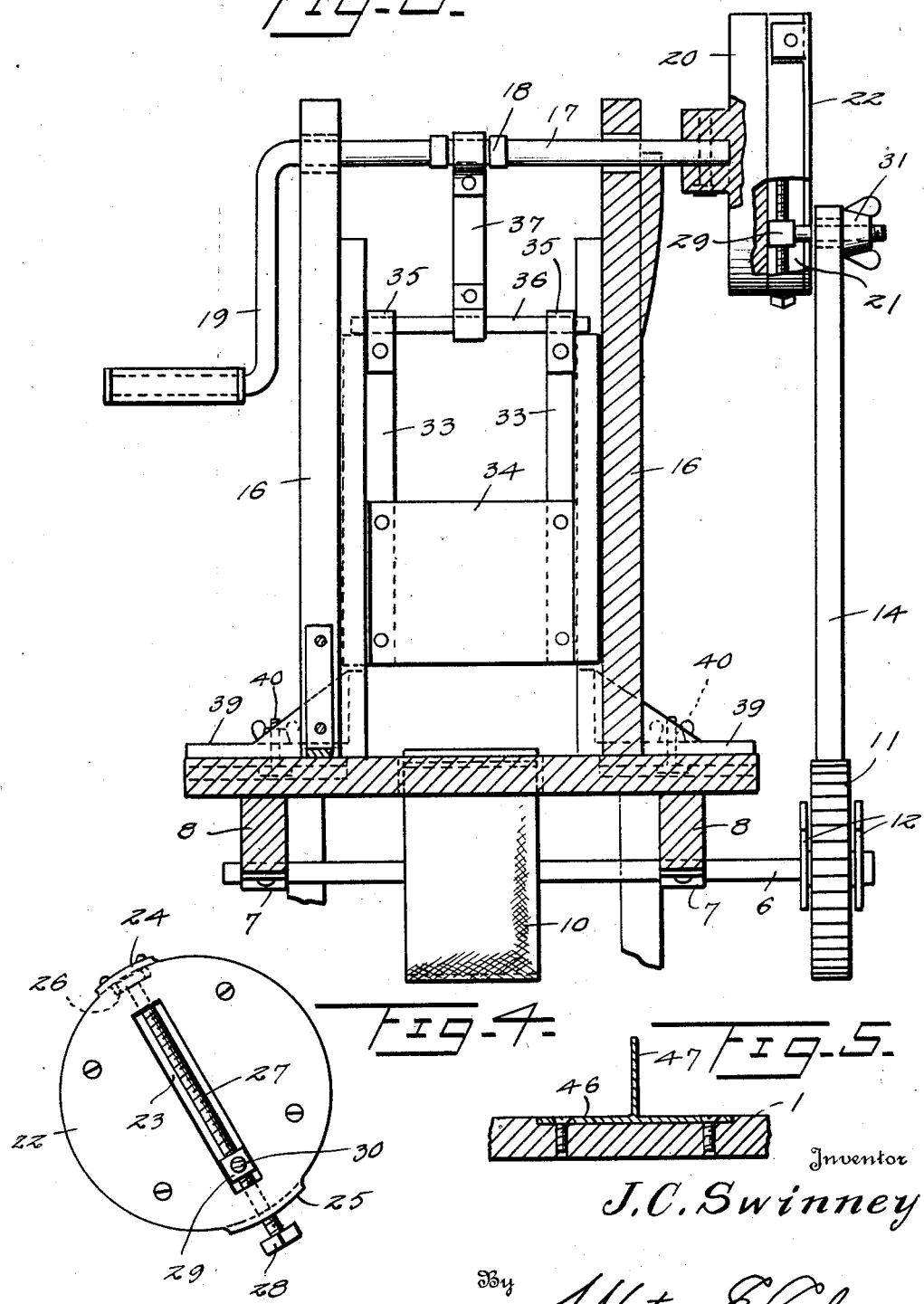

Patented Apr. 5, 1932

1,852,630

UNITED STATES PATENT OFFICE

JOSEPH CURTIS SWINNEY, OF CHATTANOOGA, TENNESSEE

MACHINE FOR CUTTING ICE CREAM OR OTHER BLOCKS

Application filed February 6, 1930. Serial No. 426,428.

This invention relates to machines for cutting bars of material of a soft or plastic nature into blocks of a predetermined size, the machine being designed primarily for cutting bars of ice cream into blocks for serving as individual portions or for sale as pint or quart bricks.

The primary object of the present invention is to provide a machine to which may be fed a bar of ice cream or any other material of this nature for cutting the same into portions of a predetermined size, the machine having a carrier associated therewith which moves the bar forward a predetermined distance after each operation of a cutting knife which severs from one end of the bar a block of the desired size.

Another object of the invention is to provide a novel means for regulating the relative movements of a cutter and a feeder which moves a block of material under the cutter for increasing or decreasing the size of the body removed from the bar by the knife.

Another object of the invention is to provide means for guiding a bar of material to position under a cutting knife which may be adjusted to take bars of different sizes.

A still further object of the invention is to provide an improved means for maintaining a bar of material in position upon retraction of the cutting knife, in the event that the bar tends to adhere to the knife.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 represents a partial top plan view of the machine embodying the present invention, parts thereof being in horizontal section.

Figure 2 is a longitudinal sectional view taken on the line 2—2 of Figure 1.

Figure 3 is a view in transverse section taken substantially upon the line 3—3 of Figure 1.

Figure 4 is a view in side elevation of the adjustable pitman connection with the knife operating crank-shaft.

Figure 5 is a sectional view taken on the line 5—5 of Figure 1.

Figure 6 is a sectional view taken on the line 6—6 of Figure 1.

Referring more particularly to the drawings wherein like numerals of reference indicate corresponding parts throughout the several views, the numeral 1 indicates generally the work table of the present machine, the same being supported in any suitable manner as for example upon the corner legs 2.

Upon the longitudinal center of the table 1 there are formed the longitudinal extending front and rear belt openings 3 and 4 respectively the same being longitudinally spaced as shown. Mounted beneath the openings 3 and 4 are the transverse shafts 5 and 6 each of which is supported beneath the table by suitable bearings 7 which are here shown as being mounted upon the under framework 8 of the table top, although it is of course understood that any other suitable means may be employed for maintaining these shafts in position.

Each of the shafts 5 and 6 carries a drum 9 and passing over and connecting these drums is an endless belt 10 which extends through the openings 3 and 4 so that a portion thereof will move over and longitudinally of the central part of the table 1 when the machine is operating as will be readily understood upon reference to Figures 1 and 2 of the drawings. This belt has the bar of ice cream or other material to be cut into sections resting thereupon during the operation of the machine and moves the bar forwardly under a cutter at suitable intervals, as will be hereinafter more fully described.

At one side of the machine the shaft 6 has secured thereto a ratchet wheel 11 and this wheel positions between a pair of arms 12 which are freely mounted on the shaft so as to oscillate without affecting the same. At their outer ends these arms are connected by a pin 13 to which one end of a pitman 14 is pivotally attached. Pivoted between the arms 12 is a pawl 15 which engages the teeth of the ratchet wheel 11 and imparts movement thereto when the arms 12 are oscillated in one direction.

Mounted at each side of the forward belt opening 4 is an upright 16 and connecting across and supported by the upper ends of the uprights 16 is a crank-shaft 17 which has the crank portion 18 therein disposed midway between the uprights 16 as shown in Figure 3. One end of the crank-shaft 17 is formed to provide a crank handle 19 by means of which rotary movement may be imparted to the shaft while upon the opposite end the crank-shaft has fixed thereto a disk or plate 20 which has a slot 21 formed diametrically across the outer face thereof as shown. Covering the outer face of the disk 20 is a plate 22 in which a closed slot 23 is formed which slot overlies the slot 21 in the disk when the plate is secured to the outer face thereof. The plate 22 has at diametrically opposite points and in alignment with the slot 23 therein the laterally projecting ears 24 and 25 which ears cover the ends of the slot 21, the ear 24 having upon the inner face thereof a bearing 26 which receives one end of a screw 27 which normally lies in the slot 21 as shown, the other end of this screw passing through the ear 25 and terminating upon the outside thereof in the head 28.

The screw 27 passes through and has threaded connection with a nut 29 which carries an arm 30 which projects through the slot 23 of the plate to receive upon its outer end the other end of the pitman 14 as shown in Figure 3, this arm also receiving a thumb screw 31 which maintains the pitman in position thereon. It will be readily seen that by loosening the thumb screw 31 to prevent engagement of the pitman 14 with the face of the plate 22 and then rotating the screw 27 the position of the arm 30 to which the pitman is attached may be altered with reference to the center of the disk 20 to increase or decrease the throw of the pitman when the crank and disk is rotated thus of course altering the throw of the arms 12 and changing the amount of rotation imparted to the ratchet wheel 11.

The confronting faces of the uprights 16 carry spaced guides 32 between which the edges of knife bars 33 slidably position. These bars 33 have their confronting edges recessed to receive the edges of a knife plate 34 which spans the area between the uprights as shown in Figure 3, the lower edge of the knife 34 lying in the same plane as the lower ends of the bars 33. At their upper ends the bars have secured thereto the collars 35 each of which has mounted therein one end of a bar 36 and the central portion of this bar is connected with the knife operating crank 18 by the crank arm 37.

Arranged at each side of the cream bar moving belt 10 is a longitudinally extending guide plate or wall 38 to the outer face of which is attached one end of a plate 39 through which an adjusting screw 40 passes. The lower end of the screw 40 has the head 41 thereof slidably positioned in the T-slot 42 formed in the surface of the table 1 and at right angles to the path of movement of the belt 10 as shown in Figure 1. It will thus be seen that adjustment of the guides 38 transversely of the table may be readily made to accommodate bars of different widths. The guide walls 38 extend from a point adjacent the front end of the conveyor belt 10 to the uprights 16 so that a bar of cream moving along the inner faces thereof will be properly run between the uprights and beneath the knife 34.

Overlying the conveyor 10 and the guides 38 directly before the uprights 16 is a plate 43 each end of which terminates in the downwardly extending portion 44 which in turn terminates in the lateral foot 45 which is secured to the top of the table 1. This broad inverted substantially U-shaped member constitutes a holding device for a bar of ice cream or other material on the table to prevent the bar from being lifted when the knife 34 is raised in the event that the bar adheres to the knife.

Removably positioned upon the front end of the table directly in alignment with the bar conveyor 10 is a splitter which comprises a base 46 and an upright fixed blade 47 which is aligned with the longitudinal center of the conveyor belt 10. This splitter may be employed for longitudinally dividing a bar of ice cream or other material as the same is fed onto the table to the conveyor belt 10 so that two bars will be carried beneath the knife 34 by the conveyor instead of a single one. If blocks are to be cut from a single bar then the splitter may be removed so that the bar can be fed intact to the conveyor belt.

From the foregoing description it is believed that the operation of the present machine will be obvious so that a detailed explanation of the same is unnecessary. It will be seen that as a bar of ice cream or other material is fed onto the table and carried under the knife 34 by the conveyor belt 10, each time the crank 18 moves upwardly to lift the knife 34 following a cutting operation the pitman 14 will actuate the pawl 15 to rotate the ratchet wheel 11 and the drum 9 carried by the shaft connected thereto. This will cause the bar of material on the belt 10 to be moved forwardly a slight distance depending upon the location of the arm 30 with respect to the center of the disk 20. If a large block is to be cut from the bar on the table then the screw 29 will be moved outwardly toward the periphery of the disk 20 so that a long throw will be given the arms 12 and of course if a small block is to be cut the nut and arm will be moved inwardly toward the center of the disk.

From the foregoing description it will be seen that there has been provided a simply constructed, easily operated machine for quickly and accurately cutting from a bar of material blocks of any desired size.

While there has been shown and described a crank at one end of the shaft 17 which is adapted to be hand operated it is, of course, obvious that mechanical means may be employed for rotating the shaft 17 if desired.

Having thus described my invention, what I claim is:—

A machine for cutting blocks from a bar of material, comprising a table, a belt arranged to travel for a portion of its length over the table for moving a bar of material longitudinally along the top of the table, a pair of vertically disposed spaced parallel standards mounted on said table at opposite sides of said means, a pair of spaced guide strips secured to each of the opposed faces of said standards, a slide member disposed between each pair of guide strips and each having one face recessed adjacent its lower end, a knife extending transversely of the space between said standards and having each side edge positioned in the recess of a slide member and secured to the member, a bar connecting the upper ends of said slide members and oscillatably mounted thereon, a crank shaft connecting the upper ends of said standards and rotatably supported thereby, a link member having one end rotatably attached to the crank of said crank shaft and having its other end rotatably connected to said oscillatable bar, and means connected to the crank shaft for intermittently moving the belt.

In testimony whereof I hereunto affix my signature.

JOSEPH CURTIS SWINNEY.